Feb. 20, 1923. 1,446,134.
W. H. F. SMITH.
SEPARATOR SPINDLE BEARING.
FILED SEPT. 3, 1918.
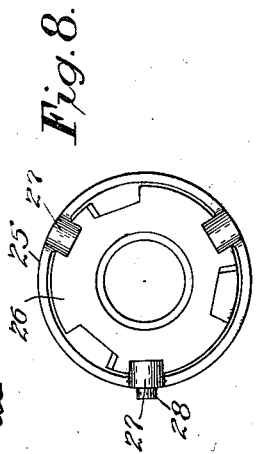
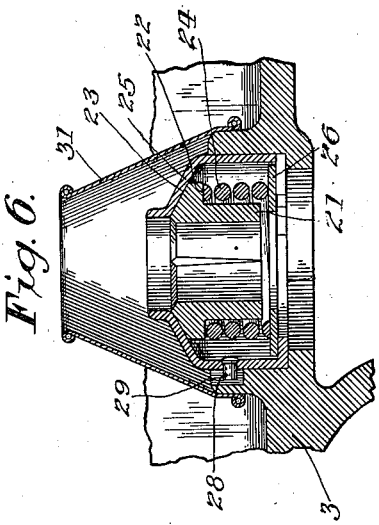
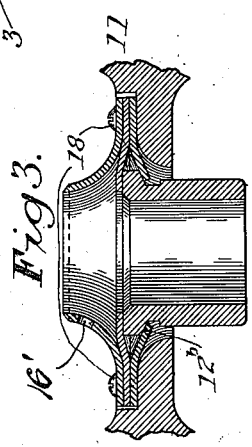
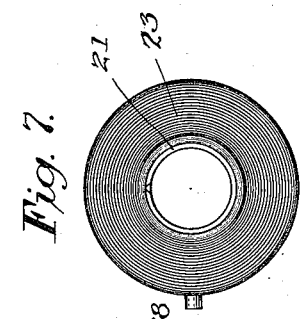
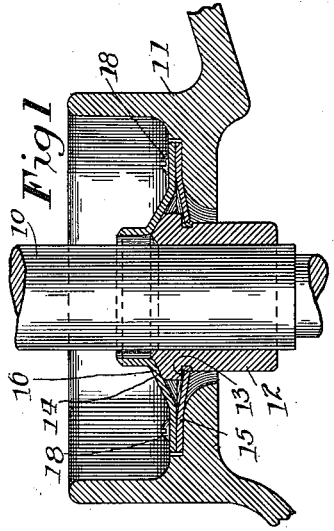
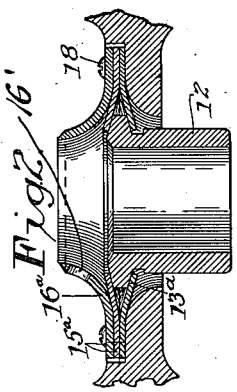
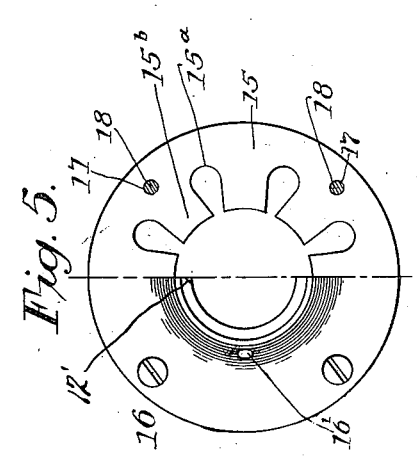
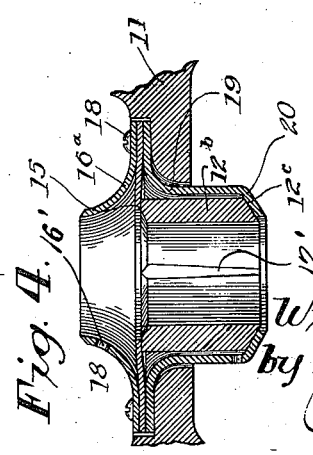
Inventor.
William H. F. Smith,
by Chas. E. Lord
Atty.

Patented Feb. 20, 1923.

1,446,134

UNITED STATES PATENT OFFICE.

WILLIAM H. F. SMITH, OF MILWAUKEE, WISCONSIN, ASSIGNOR, BY MESNE ASSIGNMENTS, TO INTERNATIONAL HARVESTER COMPANY, A CORPORATION OF NEW JERSEY.

SEPARATOR SPINDLE BEARING.

Application filed September 3, 1918. Serial No. 252,407.

*To all whom it may concern:*

Be it known that I, WILLIAM H. F. SMITH, a citizen of the United States, residing at Milwaukee, in the county of Milwaukee and State of Wisconsin, have invented certain new and useful Improvements in Separator Spindle Bearings, of which the following is a full, clear, and exact specification.

This invention relates to self-adjusting bearings.

An object of the invention is to provide a bearing which will permit a slight sidewise movement of the shaft, but which tends to return the shaft to its normal position and keep it there.

Another object is to provide a bearing which will accomplish this result by means of a thrust axially of the shaft bearing.

Another object is to provide a bearing which will meet all these requirements and yet be very simple and inexpensive to manufacture.

With these and other objects in view, my invention consists of a spring pressed floating bearing which is kept in the central position by means of said spring.

Reference is now had to the drawing in which like reference numerals apply to like parts throughout.

Figure 1 is a vertical section through the preferred form of my bearing as applied to a cream separator, showing a section of the supporting frame and the spindle shaft.

Figs. 2, 3 and 4 are similar sections through modifications of this bearing;

Fig. 5 is a half plan view of the bearing cover shown in Figs. 1 to 4 and half a plan view of the flat spring 15 of these same figures;

Fig. 6 is a partial vertical section through still another modification of the self-adjusting bearing, showing a different method of mounting, including a removable housing; and Figs. 7 and 8 are top and bottom plan views, respectively, of the removable housing.

In Figure 1 I have illustrated the preferred form of my invention in which the self-aligning bearing is shown mounted on a cream separator having the usual vertical spindle 10 with the bearing mounted in a customary manner on the framework 11 of the cream separator.

The bearing is very simple and consists of a sleeve 12 having a shoulder 13 and a beveled end 14, which are mounted between the flat spring 15 and the beveled cap or abutment 16. The bearing is held in place by means of screws 18 which pass through holes 17 in both the spring 15 and the cap 16. The form shown by Fig. 2 differs from that shown in Fig. 1 in having a different form of cover plate 16$^a$, and in having two flat springs 15$^a$ instead of one. In this form the angles of the shoulder 13$^a$ and of the end of the bearing are made the same and are held between the two flat springs instead of being held as in Fig. 1 between one spring and the cover. The form shown in Fig. 3 differs from that of Fig. 2 only in the angle of the beveled faces; in this case the greater angle is placed at the shoulder 12$^b$. In Fig. 4 I have employed the same cover plate 16$^a$ as in Fig. 2, and the flat spring 15 of Fig. 1, but the sleeve 12$^b$ in this case has no shoulder but has a beveled end 12$^c$ which corresponds to a beveled portion 20 of the housing 19. In this case the sleeve is held pressed between the spring 15 and the beveled portion 20 of the housing. Figs. 1 to 4 use a flat spring 15 as shown in Fig. 5, having notches 15$^a$ forming tongues 15$^b$ which press against the sleeve 12. Each of the sleeves 12 is provided with a tapered oil groove 12', as shown in Figs. 4 and 5, and the caps 16 and 16$^a$ have oil holes 16' through which lubricant may be introduced to the bearing bushings when required.

The form shown in Fig. 6 consists of a sleeve 21 having a shoulder 22 and a beveled end 23. Against the shoulder 22 is pressed a coil spring 24, and the sleeve and spring are held in the housing 25 by means of a plate 26 which is secured in the housing by means of lugs 27 placed thereon; this housing and its enclosed bushing is therefore removable as a unit and carries a pin 28 which is placed in a notch 29 of the frame 30 to prevent the housing from rotating with the shaft. The cover 31 is so placed as to surround the upper part of the housing.

The method of operation of all of these forms is substantially the same. It is necessary in a cream separator that the spindle bearing should be so mounted as to allow a little lateral play of the spindle, as the separator bowl is balanced when full of milk, but is often unbalanced when starting empty. In starting, therefore, there will be considerable vibration of the spindle which must be taken care of by the spindle bearing. The spring action here supplied will permit of that movement, but as the sleeve 12 is forced to one side or the other, a wedging action takes place which tends constantly to return it to the central position, and the farther the sleeve is forced from its central position the greater the tendency to return thereto.

I have described this bearing in connection with cream separators, but a bearing of this kind is capable of other uses and I do not desire to so limit its application.

While I have shown and described but a few forms of my invention, it is to be understood that it is capable of other modifications. Changes therefore in the construction and arrangement may be made without departing from the spirit and scope of the invention as defined in the appended claims.

1. In a self-adjusting bearing, a sleeve having a tapered end, a shoulder on the sleeve, an abutment having a tapered seat, a spring engaging the shoulder and forcing the tapered end against the tapered seat, and means securing the spring and abutment together substantially in the plane of the shoulder.

2. In a self-adjusting bearing, a sleeve having one end tapered, a shoulder on the sleeve, a flat spring bearing against the shoulder, and a tapered abutment against which the tapered end bears.

3. In a self-adjusting bearing, a sleeve having a tapered end, a fixed abutment having a tapered seat, and a flat spring adapted to force the sleeve axially against the abutment.

4. A self-adjusting bearing for separators comprising a bearing sleeve having a beveled end, an abutment having a beveled seat, a flat spring adapted to hold the sleeve against the abutment, the spring and abutment being in contact and adapted to be secured to the separator.

5. In a self-adjusting bearing, a frame, a bearing sleeve having a beveled end, an abutment having a beveled seat, a spring bearing against the sleeve and forcing the beveled end against the beveled seat to hold it in a central position, the abutment and spring being contiguous and secured to the frame.

6. In a self-adjusting bearing, a frame, a bearing sleeve having a beveled end, a shoulder adjacent to the beveled end, an abutment having a beveled seat, a spring bearing against the shoulder and forcing the beveled end against the seat to hold it in a central position, the abutment and spring being contiguous and secured to the frame.

In testimony whereof I affix my signature.

WILLIAM H. F. SMITH.